United States Patent
Harpur et al.

(10) Patent No.: US 10,671,371 B2
(45) Date of Patent: Jun. 2, 2020

(54) ALERTING AN OFFLINE USER OF A PREDICTED COMPUTER FILE UPDATE

(71) Applicant: INTERNATIONAL BUSINESS MACHINES CORPORATION, Armonk, NY (US)

(72) Inventors: Liam S. Harpur, Dublin (IE); John Rice, Tramore (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/005,957

(22) Filed: Jun. 12, 2018

(65) Prior Publication Data

US 2019/0377566 A1  Dec. 12, 2019

(51) Int. Cl.
| | | |
|---|---|---|
| G06F 9/44 | (2018.01) | |
| G06F 8/65 | (2018.01) | |
| H04L 29/08 | (2006.01) | |
| G06F 16/23 | (2019.01) | |

(52) U.S. Cl.
CPC ............ *G06F 8/65* (2013.01); *G06F 16/2372* (2019.01); *H04L 67/26* (2013.01)

(58) Field of Classification Search
CPC ......... G06F 8/65; G06F 16/2372; H04L 67/26
USPC .................................................. 717/100–168
See application file for complete search history.

(56) References Cited

U.S. PATENT DOCUMENTS

| | | | |
|---|---|---|---|
| 7,249,314 B2 | 7/2007 | Walker et al. | |
| 7,310,632 B2 | 12/2007 | Meek et al. | |
| 8,112,426 B2 | 2/2012 | Acharya et al. | |
| 8,990,678 B2 | 3/2015 | Bedingfield, Sr. | |
| 9,264,513 B2 | 2/2016 | Reilly et al. | |
| 2003/0084404 A1* | 5/2003 | Dweck | G06F 16/38 715/255 |
| 2003/0097410 A1 | 5/2003 | Atkins et al. | |
| 2005/0108363 A1 | 5/2005 | Torigoe et al. | |
| 2005/0235012 A1* | 10/2005 | Harry | G06F 8/71 |
| 2007/0136390 A1* | 6/2007 | Blum | G06F 16/27 |
| 2007/0239725 A1* | 10/2007 | Bhat | G06F 16/9574 |
| 2007/0239789 A1* | 10/2007 | Bhat | G06Q 10/06 |

(Continued)

OTHER PUBLICATIONS

Ahmed Shatnawi et al., "Maintaining Integrity and Non-Repudiation in Secure Offline Documents", 2017 (Year: 2017).*

(Continued)

*Primary Examiner* — Adam Lee

(74) *Attorney, Agent, or Firm* — Sean M. Douglass

(57) ABSTRACT

The method, computer program product and computer system may include a computing device which may receive a copy of a master digital, which may include metadata, file from a server. The computing device may analyze the metadata of the master digital file for a pattern of updates initiated by one or more users using one or more computing devices. The computing device may generate a file update prediction for discouraging use of an outdated version of the master digital file. The file update prediction may indicate an estimation for when the master digital file is likely to be updated based on the pattern of updates. The computing device may generate an alert for display offline on a user interface. The alert may indicate the estimation for when the master digital will be updated by the one or more users.

20 Claims, 8 Drawing Sheets

(56) References Cited

U.S. PATENT DOCUMENTS

| | | | |
|---|---|---|---|
| 2013/0191451 A1 | 7/2013 | Tse et al. | |
| 2014/0047425 A1* | 2/2014 | Thapar | G06F 8/65 717/168 |
| 2015/0264115 A1* | 9/2015 | Reilly | H04L 67/10 706/12 |
| 2016/0034506 A1 | 2/2016 | Prahlad et al. | |
| 2016/0248865 A1* | 8/2016 | Dotan-Cohen | H04L 67/26 |
| 2017/0358240 A1* | 12/2017 | Blahnik | G09B 19/00 |
| 2018/0075078 A1* | 3/2018 | Dandy | G06F 16/2322 |
| 2018/0285748 A1* | 10/2018 | Husain | G06N 20/00 |

OTHER PUBLICATIONS

Mell et al., "The NIST Definition of Cloud Computing", Recommendations of the National Institute of Standards and Technology, Special Publication 800-145, Sep. 2011, 7 pages.

Calzarossa et al., "Modeling and predicting temporal patterns of web content changes", Journal of Network and Computer Applications, vol. 56, (2015), pp. 115-123.

Glance et al., "Collaborative Document Monitoring", Group'01, Sep. 30-Oct. 3, 2001, pp. 171-178.

Disclosed Anonymously, "An Enhanced Predictive and Analytics Model for Collaboration", An IP.com Prior Art Database Technical Disclosure, IP.com No. IPCOM000244015D, Publication Date: Nov. 5, 2015, pp. 1-3.

Moran et al., "Document Presence Notification Services for Collaborative Writing", 2001 IEEE, pp. 125-133.

Radinsky et al., "Predicting Content Change on the Web", WSDM'13, Feb. 4-8, 2012, 10 pages.

Shatnawi et al., "Maintaining Integrity and Non-Repudiation in Secure Offline Documents", DocEng '17, Sep. 4-7, 2017, pp. 59-62.

Wiley, "How to Set Document Alerts in OneDrive for Business", Mar. 15, 2015, OneDrive for Business, Create and Manage Document Alerts, 4 pages, https://jonathanwylie.com/2015/03/15/how-to-set-document-alerts-in-onedrive-for-business/.

Xhafa, "Data Replication and Synchronization in P2P Collaborative Systems", 2012 26th IEEE International Conference on Advanced Information Networking and Applications, p. 7.

* cited by examiner

ALERTING AN OFFLINE USER OF A PREDICTED COMPUTER FILE UPDATE

BACKGROUND

The present invention relates generally to a method, system, and computer program for alerting an offline user using a downloaded digital file of a predicted computer file update of a master file, so that the user can go online and retrieve the updated master file. More particularly, the present invention relates to a method, system, and computer program for predicting the probability and timing of an update to a master digital file.

Digital files may contain metadata, which may convey certain details about the digital file. For example, digital file metadata can contain a history of when the digital file was created, the date the digital file was last modified, or when the date the digital file was downloaded. Further, digital files may be stored on a server where several users have access to the digital file. The digital file stored on server to which several users have access to may be referred to as a master digital file, as this file serves as the main digital file. Users may then download a copy of the master digital file for use offline. The offline copy of the master digital file can be modified and then uploaded to the server resulting in an updated master digital file.

In the above example, once a user has downloaded a copy of a master digital file, users have no guidelines as to whether their downloaded digital file copy is the most up-to-date version of that digital file or if the master digital file was updated by another user during the time the user was updating or editing the offline copy of the digital file. Typically, an offline user does not know whether their downloaded copy of the master digital file is the most current version of the master digital file and if any updates to the downloaded copy of the master digital file are still relevant or necessary. Therefore, an offline user has no way of knowing that he/she may be working on an outdated version of the master digital file. Also, a user may unknowingly update an outdated copy of a master digital file and then upload it, replacing a newer version of the master digital file with an updated older version. Thus, an offline user may cause confusion amongst a group of users sharing the master digital file by uploading outdated versions of the master digital file and potentially losing data added in newer versions. Further, a user who has downloaded a copy of the master digital file for use offline may use or rely on the information in a master file which is outdated.

BRIEF SUMMARY

An embodiment of the invention may include a method, computer program product and computer system for predicting a digital file update. The method, computer program product and computer system may include computing device which may receive a copy of a master digital file from a server. The master digital file may include metadata. The computing device may analyze the metadata of the master digital file for a pattern of updates initiated by one or more users using one or more computing devices. The computing device may generate a file update prediction for discouraging use of an outdated version of the master digital file. The file update prediction may indicate an estimation for when the master digital file is likely to be updated based on the pattern of updates. The computing device may generate an alert for display offline on a user interface. The alert may indicate the estimation for when the master digital will be updated by the one or more users to discourage and avoid use of the outdated version of the master digital file by the user.

DETAILED DESCRIPTION

Figure 1:
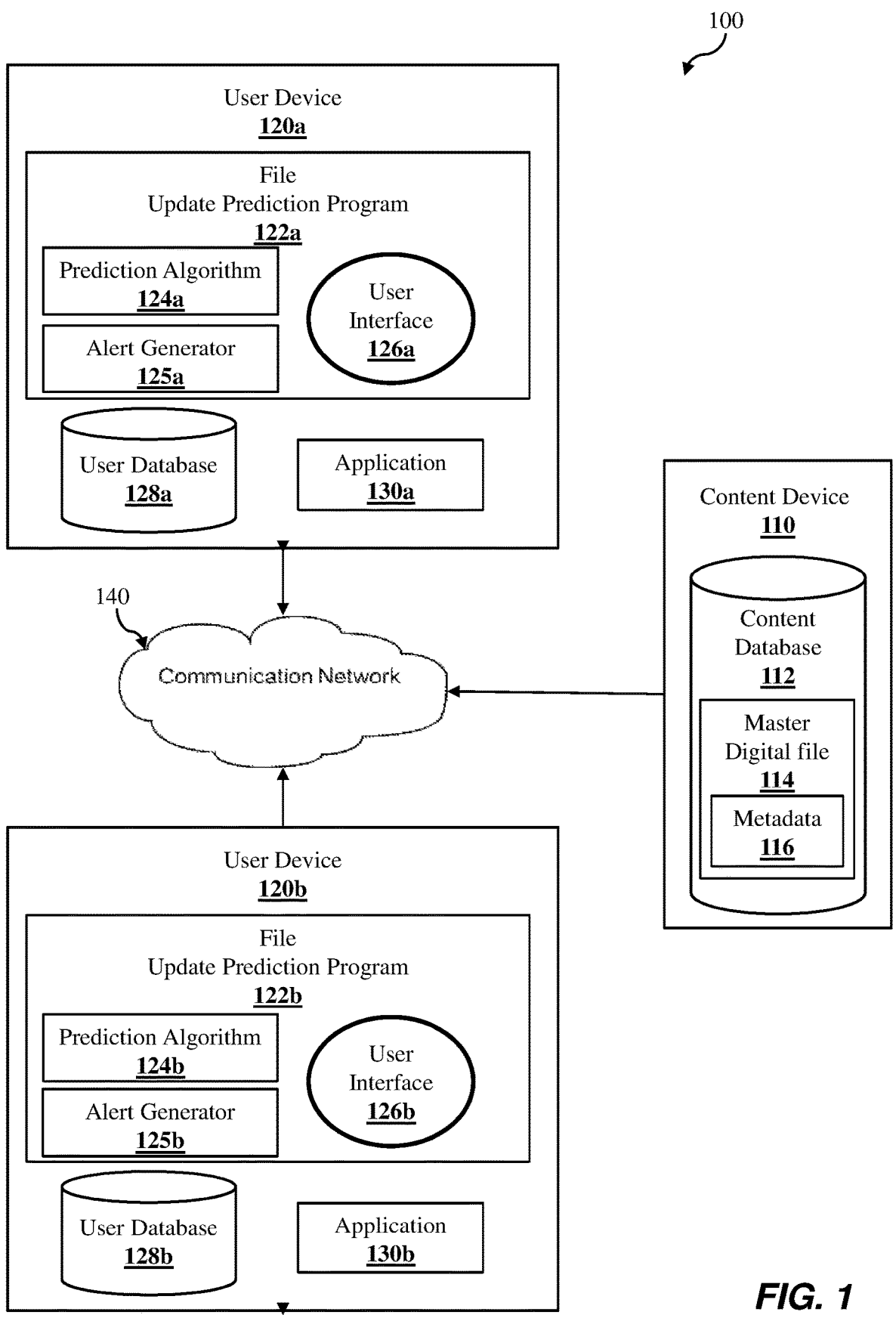
FIG. 1 illustrates a system for a digital file update prediction and alerting a user, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention provides a method, computer program, and computer system for predicting the probability and timing of an update to a master digital file and providing an alert to a user when the master digital file is likely to be updated. In an embodiment of the present invention, the metadata associated with a master digital file may be analyzed to determine the probability and timing of an update to a master digital file. The present invention may analyze the master digital file and the associated metadata, using the inventive program, while the user device running the inventive program is connected to a communications network. Thus, the master digital file and the associated metadata may be analyzed before or during the download of the master digital file by a user. Alternatively, the present invention may analyze the master digital file and the associated metadata, using the inventive program, after the master digital file has been downloaded to the user's device.

In another embodiment of the present invention, the inventive program may analyze certain user data associated with all the users who have access to the master digital file. The user data may include data from the users' calendar applications, scheduling applications, file sharing applications, social media applications, email applications, and instant messaging applications, etc. The present invention may analyze the users' data, using the inventive program, while the user device running the inventive program is connected to a communications network. Thus, the users' data may be analyzed before or during the download of the master digital file by a user. Alternatively, the present invention may download the users' data, using the inventive program, to the user device and then analyze the users' data after the users' data has been downloaded to the user's device.

Reference will now be made in detail to the embodiments of the present invention, examples of which are illustrated in the accompanying drawings, wherein like reference numerals refer to like elements throughout. Embodiments of the invention are generally directed to a system for analyzing, predicting, and alerting an offline user as to the update status of a master digital file.

FIG. 1 illustrates a file update prediction system 100, in accordance with an embodiment of the invention. In an example embodiment, file update prediction system 100 includes a content device 110, and user devices 120a, 120b interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the content device 110, and the user device 120.

The content device 110 may include a content database 112. In the example embodiment, the content device 110 may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 120 via the network 140. In some embodiments, the content device 110 includes a collection of devices or data sources. The content device 110 is described in more detail with reference to FIG. 4.

The content database 112 may be a collection of digital files including, but not limited to, audio, visual, and textual files. For example, the content database 112 may include text files, spreadsheets, PDF files, or any other digital file type which may be edited by a user or group of users. The collection of digital files on the content database 112 may include a master digital file 114. The master digital file 114 may be a digital file shared between one or more users of the user devices 120a, 120b. The master digital file 114 may include metadata 116. The metadata 116 may include, but is not limited to, history of digital file access, history of digital file updates, users who have accessed the digital files, users who have updated the digital file, digital file creation date, etc. The content database 112 located on the content device 110 can be accessed through using the network 140.

The user devices 120a, 120b may include file update prediction programs 122a, 122b, user databases 128a, 128b, and applications 130a, 130b. In the example embodiment, the user devices 120a, 120b may be a desktop computer, a notebook, a laptop computer, a tablet computer, a thin client, or any other electronic device or computing system capable of storing compiling and organizing audio, visual, or textual content and receiving and sending that content to and from other computing devices, such as the content device 110, and other user devices 120 via the network 140. The user devices 120a, 120b are described in more detail with reference to FIG. 4. While only two user devices 120a-b are illustrated, it can be appreciated that any number of user devices 120 may be part of the file update prediction system 100. Further, while reference to only one user device 120a or 120b may be used in this description, it is understood that reference to one user device and any components associated with such user device, such as user device 120a or 120b and their respective components, applies to any and all user devices and their associated components unless otherwise specified.

The file update prediction program 122a may include prediction algorithms 124a, 124b, alert generators 125a, 125b and user interfaces 126a, 126b. The file update prediction program 122a is a program capable of analyzing an original digital file, i.e. the master digital file 114, that has been selected to be downloaded by user for use offline and predict when the master digital file 114 will be updated next. The file update prediction program 122a may analyze metadata 116 and/or historical data associated with the master digital file 114 using the prediction algorithm 124a to predict when the next update to the master digital file 114 will be. The metadata 116 and/or historical data may include, but is not limited to, history of digital file access, history of digital file updates, users who have accessed the digital files, users who have updated the digital file, digital file creation date, etc. The file update predication program 122a may analyze the metadata 116 and/or the historical data associated with the master digital file 114 while the user device 120a is connected to the network 140 or the user device 120a may download the metadata 116 and/or the historical data associated with the master digital file 114 while connected to the network 140 and analyze offline. For example, the file update prediction program 122a may analyze the historical data of the master digital file 114 and determine that the master digital file 114 is being updated once a week, but on a different day each week. The file update prediction program 122a will then run the prediction algorithm 124a that will predict a date and time that the downloaded copy of the master digital file 114 will no longer be the same as the master digital file. Continuing with the example above where the file prediction program 122a determines that the master digital file 114 is being updated once a week on a different day, the prediction algorithm 124a may predict that the master digital file 114 will be updated on Monday, the first day of the following week. Alternatively, the file prediction program 122a may determine that the earliest the master digital file 114 has ever been updated was a Wednesday; thus, prediction algorithm 124a may predict that the master digital file 114 will be updated on the Wednesday of the following week. Further, the file update prediction program 122a may analyze data from the application 130 located on the user device 120a to predict when the master digital file 114 is likely to be updated next. For example, the application 130a may be a user calendar application. The file update prediction program 122a may analyze the user calendar application to determine if the update of the master digital file 114 will remain on schedule or be interrupted because, for example, a user will be away on vacation. Continuing with the example above where the file prediction program 122a determines that the master digital file 114 is being updated once a week on a different day by a user on the user device 120b, the file prediction program 122a may further determine from analysis of the application 130b that a user of user device 120b who normally updates the master digital file 114 is on vacation for the next two weeks. Thus, prediction algorithm 124a may predict, for a user on the user device 120a, that the file will be updated on Monday, two weeks after a copy of the master digital file 114 has been downloaded. The application 130a is described in more detail below. Further, once the file update prediction program 122a has predicted when the master digital file 114 will be updated next, the file update prediction program 122a may output a display using the alert generator 125a to a user of the user device 120a in association with the downloaded digital file to indicate how long until the master digital file 114 is updated. For example, the alert generator 125a of the file update prediction program 122a may display an offline alert.

The prediction algorithm 124a may be any algorithm capable of analyzing digital files, the associated metadata 116 and historical data with those digital files, and data associated with application 130a to calculate the probability of when the digital file will be updated next. The prediction algorithm 124a may utilize, for example, but not limited to, linear discriminant analysis (LDA) to ascertain the optimum heartbeat, or "keepalive", on a digital file. For example, the prediction algorithm 124a may create a graphical representation of the data, for example, a heat map, illustrating groupings of data based on, but not limited to, historical interactions between digital file users of a digital file, user downloads and access of a digital file, updates of a digital file. Prediction algorithm 124a may analyze these heat map groupings to determine the dominant heat group, i.e. cluster, and based on that cluster, predict when a digital file will be updated.

The user interface 126a includes components used to receive input from a user on the user device 120a and transmit the input to the file update prediction program 122a, or conversely to receive information from the file update prediction program 122a and display the information to the user on the user device 120a. In an example embodiment, the user interface 126a uses a combination of technologies and devices, such as device drivers, to provide a platform to enable users of user device 120a to interact with the file update prediction program 122a. In the example embodiment, user interface 126a receives input, such as textual input received from a physical input device, such as a keyboard.

User database 128a may include digital files stored for use by user device 120a such as the copy of the master digital file 114 downloaded by the user to user device 110a. Digital files may be created on user device 120a and stored on user database 128a or the digital files may be downloaded from another computing device, such as, but not limited to, the content device 110. Digital files may include, but is not limited to, audio, visual, and textual content. For example, user database 128a may contain a text document that has been created by a user of the user device 120a. Further, the text document created by a user of the user device 120a and stored on the user database 128a, may be shared and edited by user of the user device 120b. In another example embodiment, the user database 128a may contain a text document downloaded from the content device 110 over the network 140. Further, the text document downloaded from the content device 110 may be shared and edited by users of the user devices 120a, 120b.

The application 130a may be any computer application which has information relating to the availability or activity of a user such as, but not limited to, calendar applications, scheduling applications, file sharing applications, social media applications, email applications, and instant messaging applications, etc. As stated above, application 130a may be a user's calendar application. Thus, the file update prediction program 122a may use data associated with the application 130a to help predict when the master digital file 114 will be updated. For example, the master digital file 114 may be stored on the content database 112 and shared between two users on the user devices 120a and 120b and updated periodically by the first user on the user device 120a. The second user on the user device 120b may want to download a copy of the master digital file 114 for use offline. Before a copy of the master digital file 114 is downloaded, the file update prediction program 122a will analyze the master digital file 114 including application 130a resident on the user device 120a of the first user to predict when the master digital file 114 will be updated. For example, the file update prediction program 122a may find that the master digital file 114 is updated once a week by the first user on different day each week, but that the first user will be away on vacation for the next week based on the application 130a. Thus, the file update prediction program 122a may predict that the master digital file 114 will not be updated on its regular schedule but will be updated in one week when the first user returns from vacation. While only a single application 130a is illustrated, it can be appreciated that the user device 120a may include multiple applications.

Figure 2:
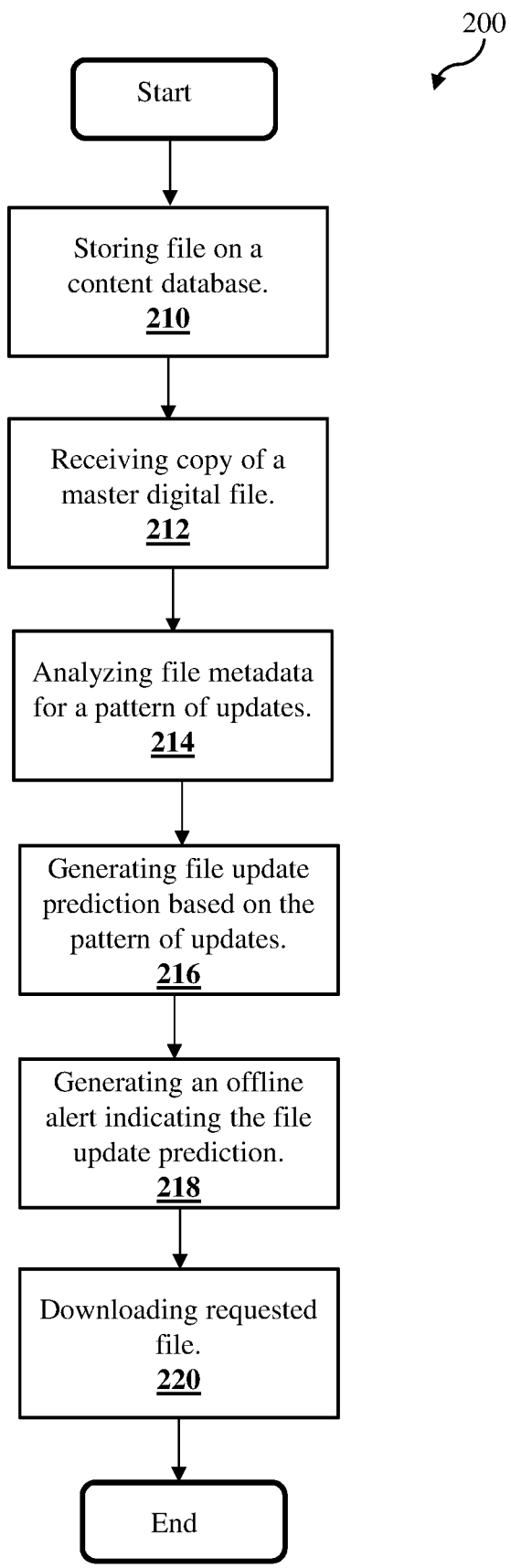
FIG. 2 is a flowchart illustrating an example method of the digital file update prediction, in accordance with an embodiment of the invention.

Referring to FIG. 2, a method 200 for file update prediction is depicted, in accordance with an embodiment of the present invention.

Referring to block 210, the master digital file 114 is stored on the content database 112 by a user on the user device 120a. The master digital file 114 being stored on the content database 112 may be a new master digital file or it may be an updated master digital file. For example, a user on the user device 120a may have downloaded a copy of the master digital file 114 from the content database 112 over network 140, modified the copy and is now uploading the copy to update the master digital file 114 on the content database 112. Thus, content database 112 is storing an updated version of the master digital file 114 already stored on content database 112. Alternatively, a user on the user device 120a may have created a new digital file and is now saving that new digital file as the master digital file 114 to the content database 112 so that other users on user device 120a may access the new master digital file 114.

Referring to block 212, the user device 120a receives a copy of the master digital file 114 stored on content database 112 over network 140. For example, a user on device 120a may request to download a copy of the master digital file 114 stored on content database 112 for use offline.

Referring to block 214, the digital file is analyzed by the file update prediction program 122a using the prediction algorithm 124*a*. The file update prediction program 122*a* analyzes the master digital file 114 while the user is still connected to network 140. For example, the file update prediction program 122*a* may analyze data associated with the master digital file 114, such as, but not limited to, the metadata 116, and the historical data as described in more detail above with reference to FIG. 1. Referring to block 216, the file update prediction program 122*a* generates a file update prediction for the master digital file 114. The file update prediction may be based on the analysis of the master digital file 114 performed at block 214. The file update prediction may include the date and time the master digital file 114 stored on content database 112 will be updated next. For example, the file update prediction program 122*a* may determine that the master digital file 114 stored on the content database 112 is updated every Friday at 4:00 p.m. In the preceding example, the file update prediction program 122*a* will generate a file update prediction that the master digital file 114 stored on the content database 112 will be updated on the Friday following the date of download at 4:00 p.m. Thus, the downloaded copy of the master digital file 114 will most likely no longer be the most up-to-date version of that master digital file 114 as of the Friday following the date of download at 4:00 p.m.

Referring to block 218, the file update prediction program 122*a* using alert generator 125*a* creates an offline alert indicating when the master digital file 114 is likely to be updated. The offline alert may be any display notification, including but not limited to, a visual notification, to indicate a time when the master digital file 114 is due to be updated. For example, the offline alert may be, but is not limited to, a timestamp to indicate a time when the master digital file 114 would likely be updated, or a countdown clock counting down to a time when the master digital file 114 would likely be updated. Further, the offline alert may include, but is not limited to, a notification on the user interface 126*a*, a notification on the downloaded copy of the master digital file 114, or a notification on the desktop of the user device 120*a*, etc. In yet another embodiment of the invention, the offline alert may be color coded to indicate the how long is left until the master digital file 114 is updated. For example, the offline alert may start off as green to indicate that more than a threshold amount of time is left before the master digital file 114 is due to be updated. The offline alert may turn yellow as the threshold amount of time nears and the offline alert may then turn red once the threshold amount of time has passed. In the preceding example, the threshold amount of time is a predetermined time before the master digital file 114 is due to be update, for example, but not limited to, an hour, a day, two days, etc. The threshold amount of time may be predetermined by the file update prediction program 122*a* based on the analysis performed at block 214 such that the threshold amount of time is tied to the file update prediction. Thus, the alert may prevent a user from updating an old version of the master digital file 114 or replacing a newer version of the master digital file 114 uploaded by another user with an updated older version of the master digital file 114. Further, the alert may prevent a user from using or relying on outdated or incorrect information contained in an outdated version of the master digital file 114.

Referring to block 220, a copy of the master digital file 114 stored on content database 112 is downloaded to user device 120*a*. In an embodiment of the invention, a copy of the master digital file 114 may be downloaded to user database 128*a*.

Figure 3:
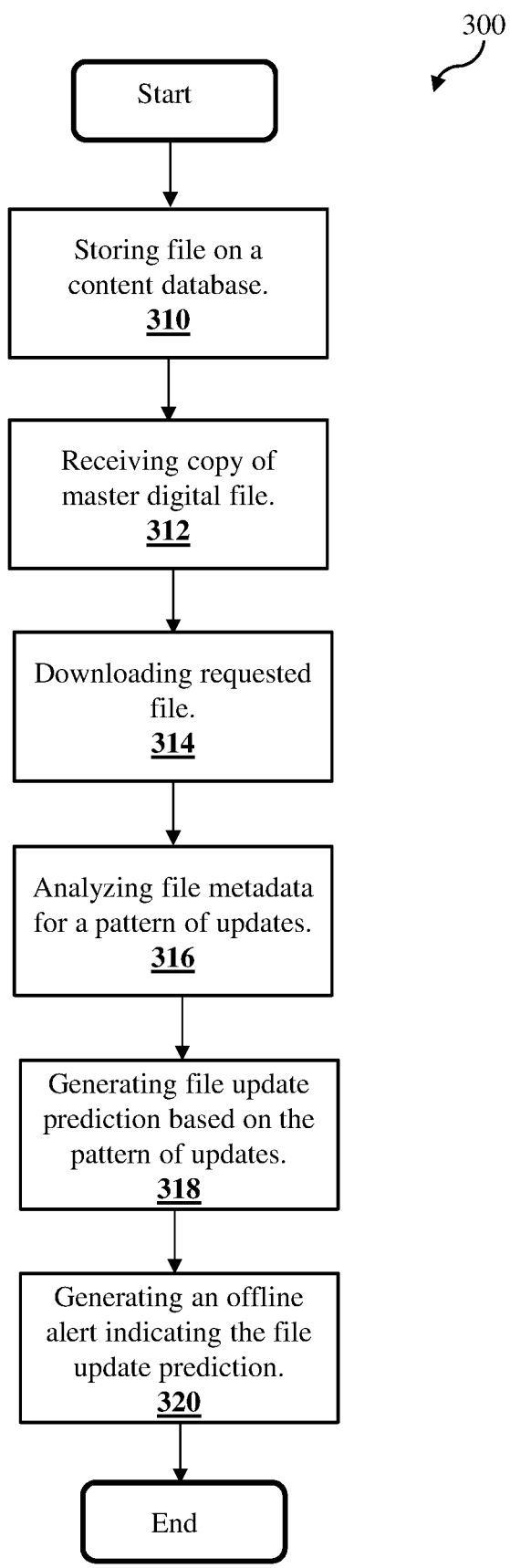
FIG. 3 is a flowchart illustrating an example method of the digital file update prediction, in accordance with an embodiment of the invention.

Referring to FIG. 3, another example method 300 for file update prediction is depicted, in accordance with an embodiment of the present invention. The embodiment of FIG. 3 is substantially similar to that of FIG. 2 with blocks 310-312 being the same as blocks 210-212, block 314 being the same as block 220, and blocks 316-320 being the same as blocks 214-218. Thus, the embodiment illustrated by method 300 allows for a copy of a master digital file 114 and the associated metadata 116 to be downloaded to the user device 120*a* by the file update prediction program 122*a* before the file update prediction program 122*a* analyzes the metadata 116, generates a file update prediction, and creates an offline alert. The embodiment of FIG. 3 may be understood with reference to FIG. 2.

Figure 4:
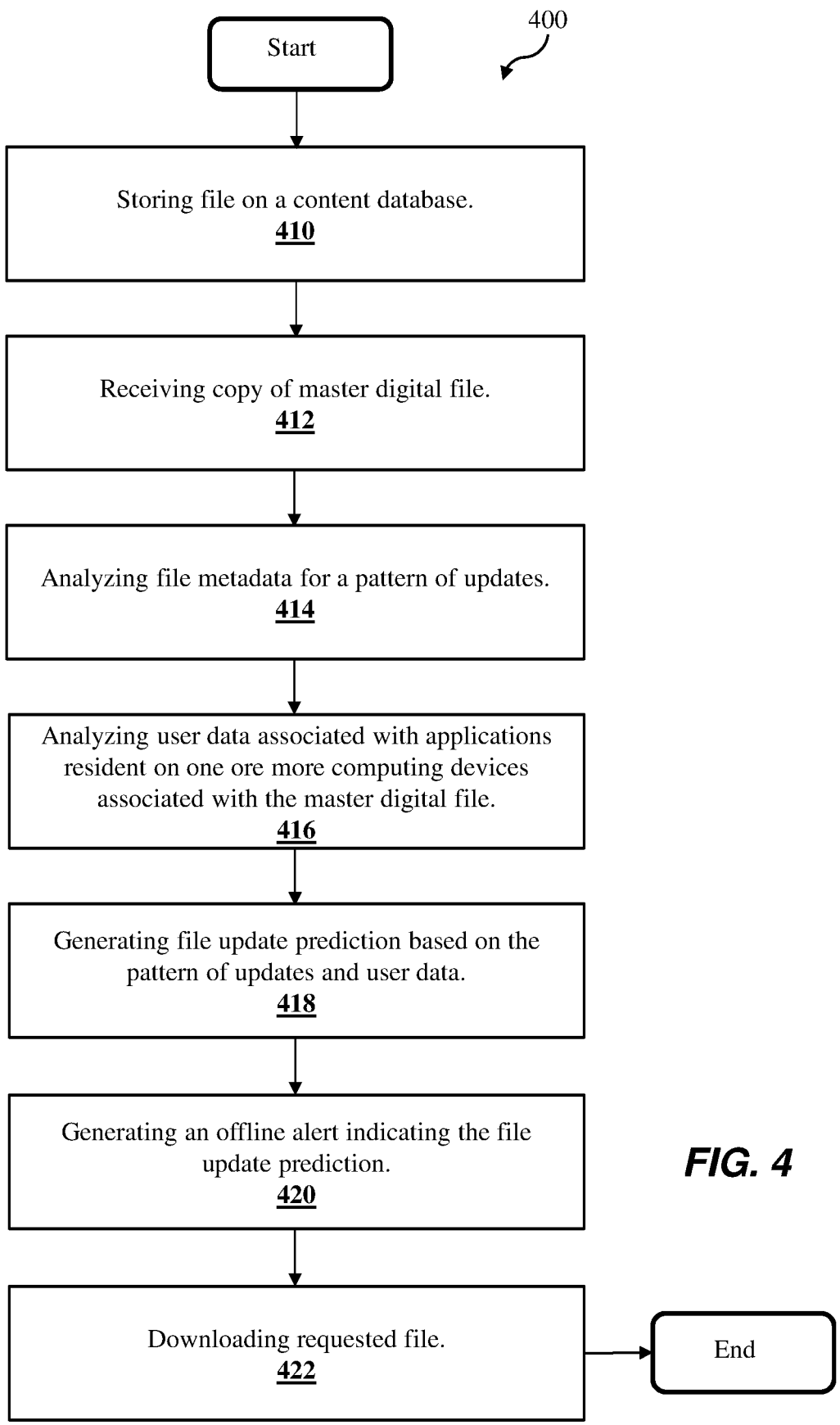
FIG. 4 is a flowchart illustrating an example method of the digital file update prediction, in accordance with an embodiment of the invention.

Referring to FIG. 4, another example method file update prediction is depicted, in accordance with an embodiment of the present invention. The embodiment of FIG. 4 is substantially similar to that of FIG. 2 with blocks 410-414 being the same as blocks 210-214 and blocks 418-422 being the same as blocks 216-220. Thus, FIG. 4 is the same as FIG. 2, with block 416 added. The embodiment of FIG. 4 may be understood with reference to FIG. 2.

Referring to block 318, the file update prediction program 122 analyzes user data associated with the application 130*a* on user device 120*a*. While only a single application 130*a* is illustrated, the file update prediction program 122*a* may analyze one or more applications on user device 120*a*. Further, the file update prediction program 122*a* may analyze one or more of the user device 120*a*. For example, the master digital file 114 may be shared between two people on the user devices 120*a*, 120*b*. Thus, the file update prediction program 122*a* would analyze the applications 130*a*, 130*b* or several applications on each of the user devices 120*a*, 120*b*.

Figure 5:
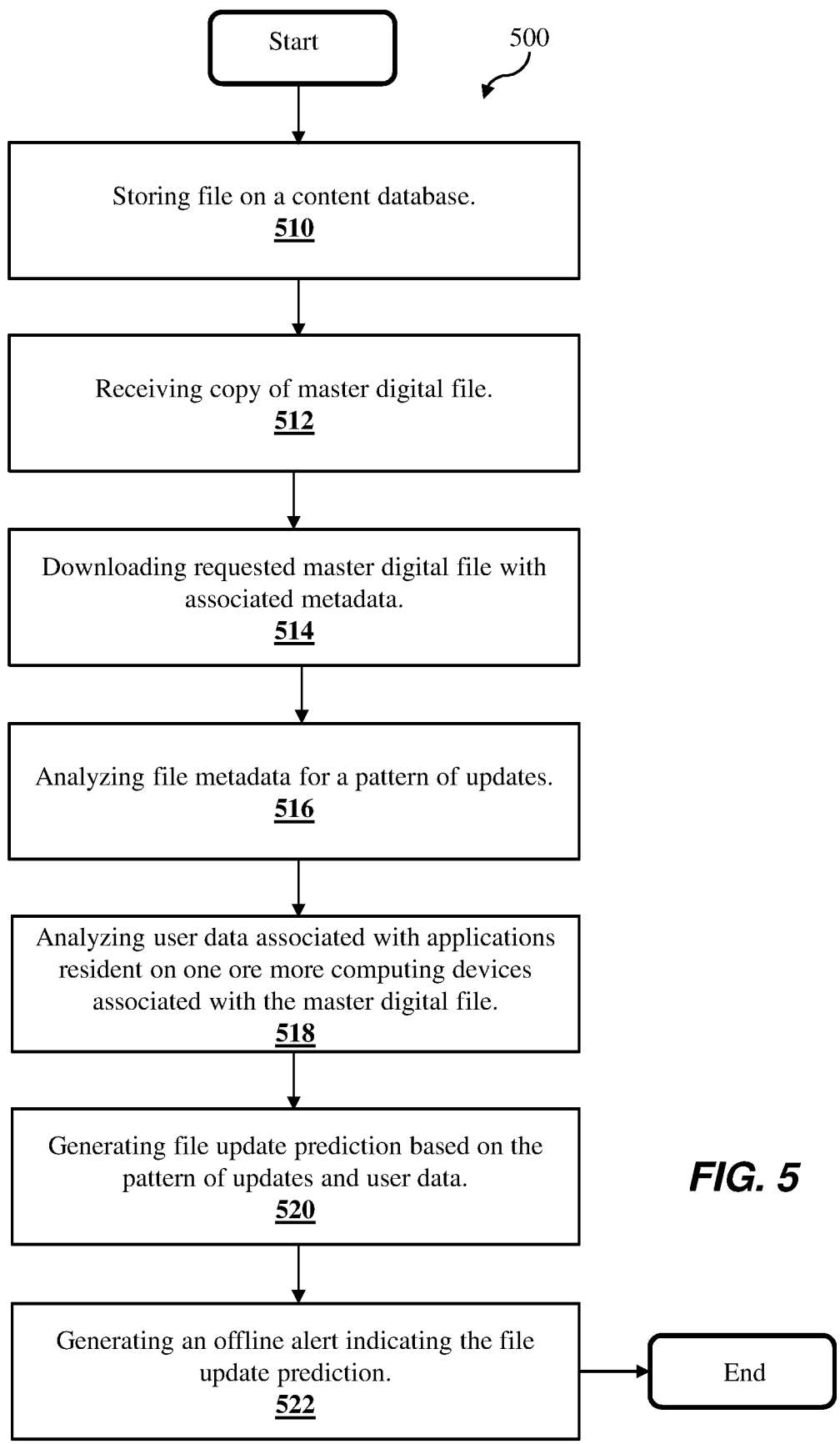
FIG. 5 is a flowchart illustrating an example method of the digital file update prediction, in accordance with an embodiment of the invention.

Referring to FIG. 5, another example method 500 for file update prediction is depicted, in accordance with an embodiment of the present invention. The embodiment of FIG. 5 is substantially similar to that of FIG. 4 with blocks 510-512 being the same as blocks 410-412, block 514 being the same as block 422, and blocks 516-522 being the same as blocks 414-420. Thus, the embodiment illustrated by method 500 allows for a copy of the master digital file 114 document and the associated metadata 116 to be downloaded the user device 120*a* before the file update prediction program 122*a* analyzes the associated metadata 116 and user data, generates a file update prediction, and creates an offline alert. The embodiment of FIG. 5 may be understood with reference to FIG. 4.

Figure 6:
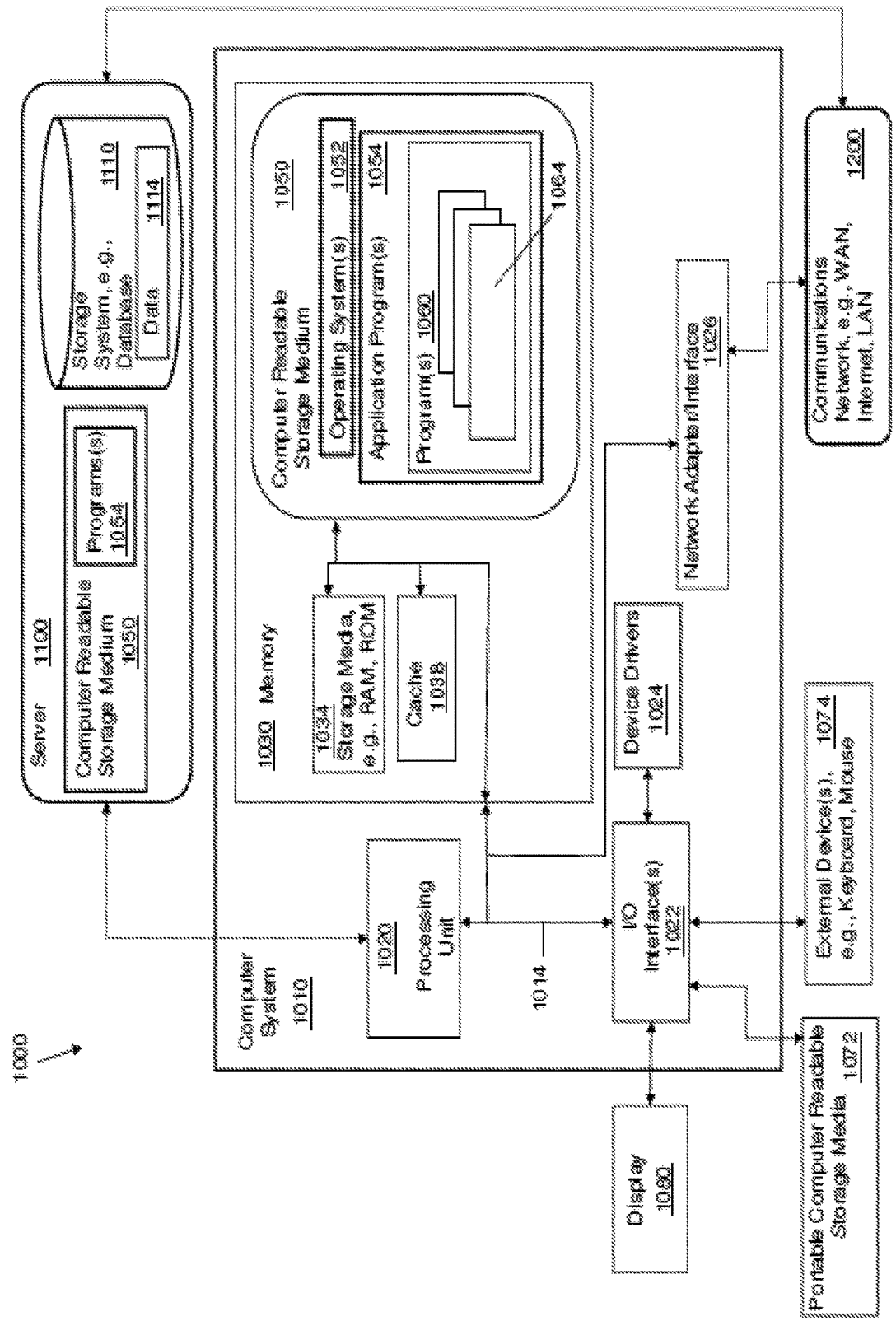
FIG. 6 is a block diagram depicting the hardware components of the digital file update prediction system of FIG. 1, in accordance with an embodiment of the invention.
Figure 7:
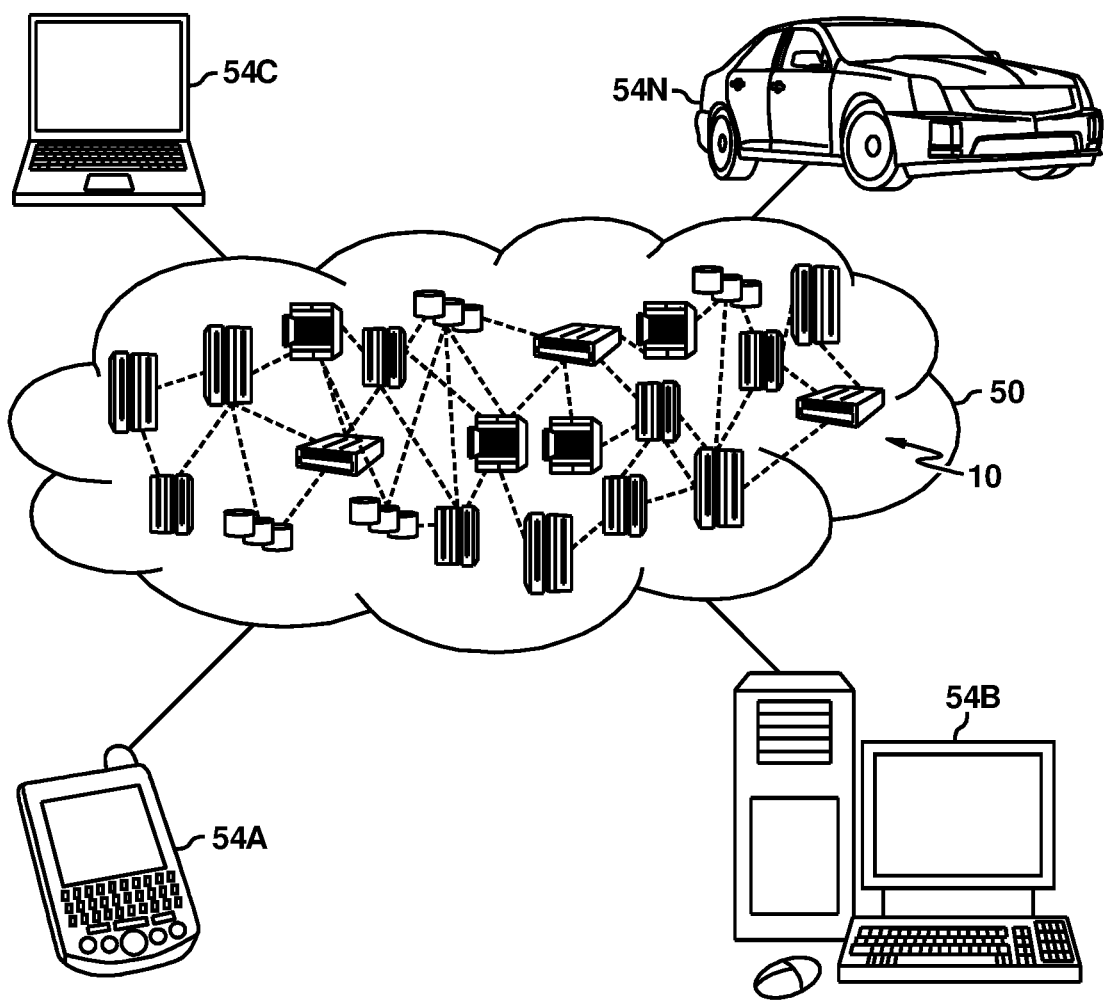
FIG. 7 illustrates a cloud computing environment, in accordance with an embodiment of the invention.
Figure 8:
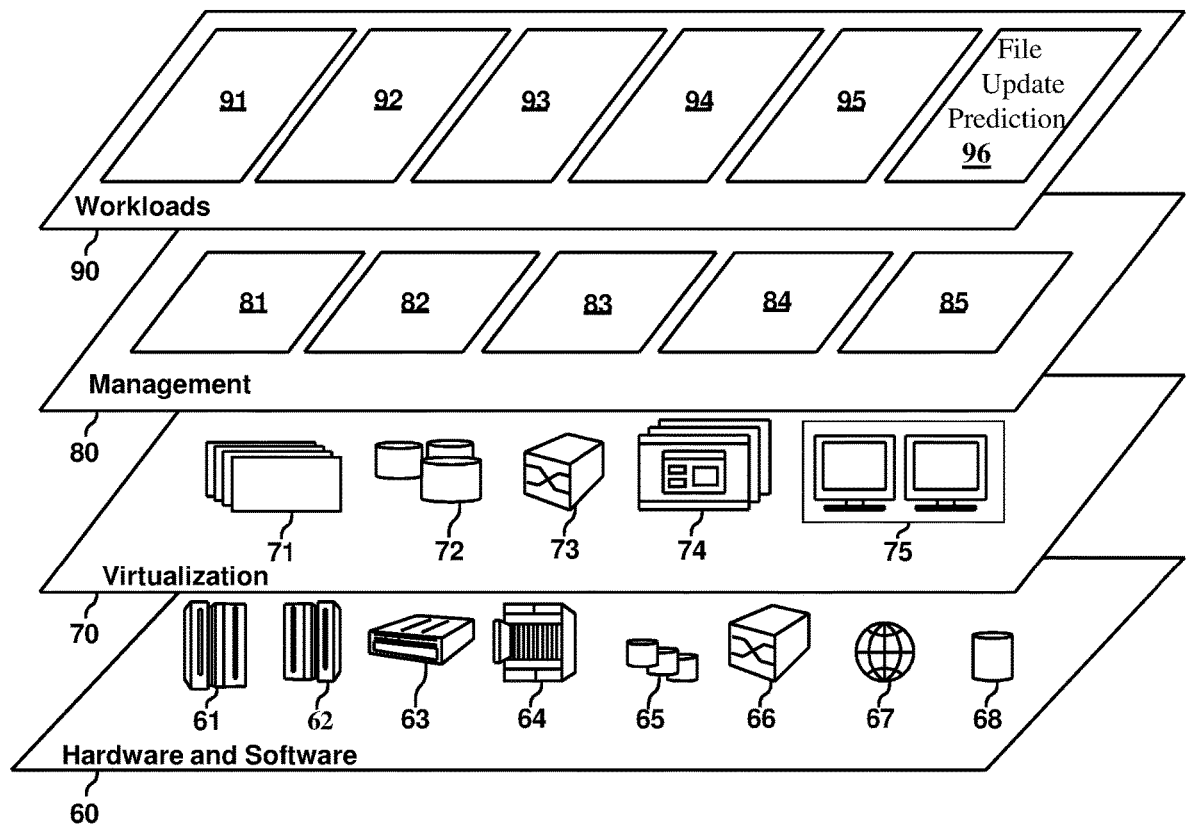
FIG. 8 illustrates a set of functional abstraction layers provided by the cloud computing environment of FIG. 7, in accordance with an embodiment of the invention.

Referring to FIG. 6, a system 1000 includes a computer system or computer 1010 shown in the form of a generic computing device. The methods 200, 300, 400, and 500, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200, 300, 400, and 500 (FIGS. 2-5), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file update prediction 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for predicting a master digital file update, the method comprising:
   receiving, by a first computing device, a copy of a master digital file from a server for use offline by a first user of the first computing device, wherein the master digital file is stored on the server and includes metadata identifying users who have updated the master digital file, and wherein the master digital file is shared between the first user and one or more secondary users;
   analyzing, by the first computing device, the metadata of the master digital file and determining a pattern of updates initiated by the first user using the first computing device and the one or more secondary users using one or more second computing devices, respectively, wherein the pattern of updates indicates a regular time interval the master digital file is updated;
   generating, by the first computing device, a master digital file update prediction indicating an estimated timestamp for when the master digital file is likely to be updated by one of the one or more secondary users based on the pattern of updates;
   generating, by the first computing device, an offline alert indicating the estimated timestamp for when the master digital file is likely to be updated by the one of the one or more secondary users, wherein the offline alert further includes information discouraging use of the copied master digital file on the first computing device by the first user at or after the estimated timestamp; and
   displaying the offline alert on a user interface of the first computing device, wherein the offline alert is displayed when the first computing device is offline.

2. A method as in claim 1, further comprising:
   analyzing applications resident on the first computing device and the one or more second computing devices for user data of the first user and the one or more secondary users; and
   updating the pattern of updates if the user data of the first user and one or more secondary users indicates the pattern of updates will be interrupted.

3. A method as in claim 2, wherein the user data includes user application data from at least one of the group of user applications consisting of: a user calendar, a user social media account, or a user schedule.

4. A method as in claim 1, wherein the offline alert indicates a time estimation comprising a countdown clock to when the master digital file is likely to be updated by the one or more secondary users.

5. A method as in claim 1, wherein the metadata includes historical information as to when the master digital file has been updated.

6. A method as in claim 1, wherein the offline alert is displayed on the copied master digital file.

7. A method as in claim 1, wherein the analyzing includes determining clusters of user activity using linear discriminant analysis, and wherein the clusters of user activity are based on interactions by the first user and the one or more secondary users with the master digital file.

8. A computer program product for master digital file update prediction, the computer program product comprising:
- a non-transitory computer-readable storage medium having program instructions embodied therewith, the program instructions executable by a computer to cause the computer to perform a method, comprising:
  - receiving, by a first computing device, a copy of a master digital file from a server for use offline by a first user of the first computing device, wherein the master digital file is stored on the server and includes metadata identifying users who have updated the master digital file, and wherein the master digital file is shared between the first user and one or more secondary users;
  - analyzing, by the first computing device, the metadata of the master digital file and determining a pattern of updates initiated by the first user using the first computing device and the one or more secondary users using one or more second computing devices, respectively, wherein the pattern of updates indicates a regular time interval the master digital file is updated;
  - generating, by the first computing device, a master digital file update prediction indicating an estimated timestamp for when the master digital file is likely to be updated by one of the one or more secondary users based on the pattern of updates;
  - generating, by the first computing device, an offline alert indicating the estimated timestamp for when the master digital file is likely to be updated by the one of the one or more secondary users, wherein the offline alert further includes information discouraging use of the copied master digital file on the first computing device by the first user at or after the estimated timestamp; and
  - displaying the offline alert on a user interface of the first computing device, wherein the offline alert is displayed when the first computing device is offline.

9. A computer program product as in claim 8, further comprising:
- analyzing applications resident on the first computing device and the one or more second computing devices for user data of the first user and the one or more secondary users; and
- updating the pattern of updates if the user data of the first user and one or more secondary users indicates the pattern of updates will be interrupted.

10. A computer program product as in claim 9, wherein the user data includes user application data from at least one of the group of user applications consisting of: a user calendar, a user social media account, or a user schedule.

11. A computer program product as in claim 9, wherein the metadata includes historical information as to when the master digital file has been updated.

12. A computer program product as in claim 8, wherein the offline alert indicates a time estimation comprising a countdown clock to when the master digital file is likely to be updated by the one or more secondary users.

13. A computer program product as in claim 8, wherein the offline alert is displayed on the copied master digital file.

14. A computer program product as in claim 8, wherein the analyzing includes determining clusters of user activity using linear discriminant analysis, and wherein the clusters of user activity are based on interactions by the first user and the one or more secondary users with the master digital file.

15. A system for file update prediction, the system comprising:
- a computer system comprising, a processor, a non-transitory computer readable storage medium, and program instructions stored on the computer readable storage medium being executable by the processor to cause the computer system to:
  - receive, by a first computing device, a copy of a master digital file from a server for use offline by a first user of the first computing device, wherein the master digital file is stored on the server and includes metadata identifying users who have updated the master digital file, and wherein the master digital file is shared between the first user and one or more secondary users;
  - analyze, by the first computing device, the metadata of the master digital file and determine a pattern of updates initiated by the first user using the first computing device and the one or more secondary users using one or more second computing devices, respectively, wherein the pattern of updates indicates a regular time interval the master digital file is updated;
  - generate, by the first computing device, a master digital file update prediction indicating an estimated timestamp for when the master digital file is likely to be updated by one of the one or more secondary users based on the pattern of updates;
  - generate, by the first computing device, an offline alert indicating the estimated timestamp for when the master digital file is likely to be updated by the one of the one or more secondary users, wherein the offline alert further includes information discouraging use of the copied master digital file on the first computing device by the first user at or after the estimated timestamp; and
  - display the offline alert on a user interface of the first computing device, wherein the offline alert is displayed when the first computing device is offline.

16. A system as in claim 15, further comprising program instructions to:
- analyze applications resident on the first computing device and the one or more second computing devices for user data of the first user and the one or more secondary users; and
- updating the pattern of updates if the user data of the first user and the one or more secondary users indicates the pattern of updates will be interrupted.

17. A system as in claim 16, wherein the user data includes user application data from at least one of the group of user applications consisting of: a user calendar, a user social media account, or a user schedule.

18. A system as in claim 16, wherein the metadata includes historical information as to when the master digital file has been updated.

19. A system as in claim 15, wherein the offline alert indicates a time estimation comprising a countdown clock to when the master digital file is likely to be updated by the one or more secondary users.

20. A system as in claim 15, wherein the offline alert is displayed on the copied master digital file.

* * * * *